(12) United States Patent
Mochida et al.

(10) Patent No.: US 11,343,520 B2
(45) Date of Patent: May 24, 2022

(54) VIDEO TRANSMISSION DEVICE AND VIDEO TRANSMISSION METHOD

(71) Applicant: NIPPON TELEGRAPH AND TELEPHONE CORPORATION, Tokyo (JP)

(72) Inventors: Yasuhiro Mochida, Musashino (JP); Takahiro Yamaguchi, Musashiro (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/268,901

(22) PCT Filed: Aug. 19, 2019

(86) PCT No.: PCT/JP2019/032272
§ 371 (c)(1),
(2) Date: Feb. 16, 2021

(87) PCT Pub. No.: WO2020/040085
PCT Pub. Date: Feb. 27, 2020

(65) Prior Publication Data
US 2021/0329278 A1 Oct. 21, 2021

(30) Foreign Application Priority Data
Aug. 24, 2018 (JP) .............................. JP2018-157389

(51) Int. Cl.
*H04N 19/31* (2014.01)
*H04N 19/114* (2014.01)
(Continued)

(52) U.S. Cl.
CPC ........... *H04N 19/31* (2014.11); *H04N 19/114* (2014.11); *H04N 19/177* (2014.11); *H04N 19/188* (2014.11)

(58) Field of Classification Search
None
See application file for complete search history.

(56) References Cited

U.S. PATENT DOCUMENTS

| 2016/0073119 A1* | 3/2016 | Toma ................... H04N 21/236 |
| | | 375/240.02 |
| 2017/0054991 A1* | 2/2017 | Tsukagoshi .......... H04N 19/188 |
| 2018/0352260 A1* | 12/2018 | Ishida .................. H04N 19/114 |

FOREIGN PATENT DOCUMENTS

| JP | 4092705 B2 | 5/2008 |
| WO | WO-2014203516 A1 | 12/2014 |

OTHER PUBLICATIONS

ARIB STD-B60 "MMT-Based Media Transport Scheme in Digital Broadcasting Systems," Association of Radio Industries and Business, Version 1.13, Oct. 11, 2018.
(Continued)

*Primary Examiner* — Samuel D Fereja
(74) *Attorney, Agent, or Firm* — Harness, Dickey & Pierce, P.L.C.

(57) ABSTRACT

The present disclosure aims to provide a method for detecting a GOP boundary of an encoded bit stream of each layer and associating GOPs of the layers for hierarchical transmission in a video transmission device that transmits a hierarchically encoded bit stream. The present disclosure provides a video transmission device and a video transmission method that detect a GOP head access unit in a base layer of a hierarchically encoded bit stream by analyzing the base layer and detect a head access unit of an enhancement layer of an identical GOP to that of the aforementioned access unit from a decoding time stamp of the access unit by using the relationship between a decoding time stamp of the base layer and a decoding time stamp of the enhancement layer.

10 Claims, 4 Drawing Sheets

(51) Int. Cl.
*H04N 19/177* (2014.01)
*H04N 19/169* (2014.01)

(56) References Cited

OTHER PUBLICATIONS

ARIB STD-B32 "Video Coding, Audio Coding, and Multiplexing Specifications for Digital Broadcasting," Association of Radio Industries and Business, Jul. 26, 2018.
Yasuhiro Mochida et al "An MMT Module for 4 K/120 fps Temporally Scalable Video", 2019 IEEE International Symposium on Circuits and Systems (ISCAS), May 1, 2019.

\* cited by examiner

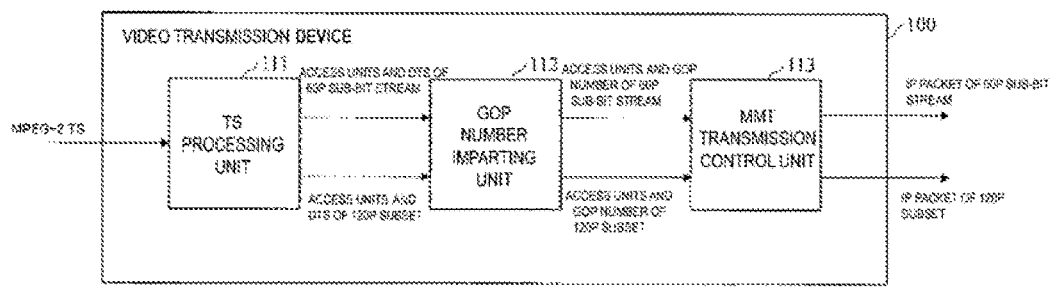
Fig. 4
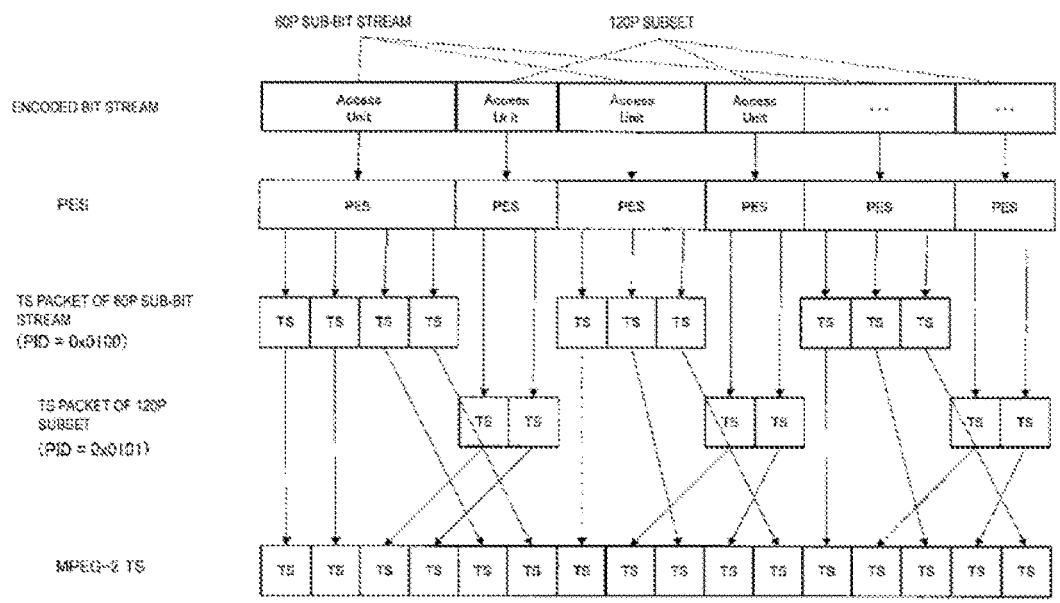
Fig. 5
Fig. 6

VIDEO TRANSMISSION DEVICE AND VIDEO TRANSMISSION METHOD

CROSS-REFERENCE TO RELATED APPLICATIONS

This application is a 371 U.S. National Phase of International Application No. PCT/JP2019/032272, filed Aug. 19, 2019, which claims priority to Japanese Patent Application No. 2018-157389, filed Aug. 24, 2018. The entire disclosures of the above applications are incorporated herein by reference.

TECHNICAL FIELD

The present disclosure relates to a method and an device for transmitting videos. In particular, the present disclosure relates to a method and an device for hierarchically transmitting an encoded bit stream of a hierarchically encoded video signal.

BACKGROUND ART

A video encoding scheme such as H. 265 supports hierarchical encoding that generates a hierarchically encoded bit stream with a hierarchical structure in a time direction or a spatial direction. A hierarchically encoded bit stream is constituted by a base layer that is essential for decoding and an enhancement layer that is not essential for decoding, and if the bit stream is decoded using up to the enhancement layer, a decoded video with higher quality can be obtained than in decoding performed only using the base layer. This allows the single encoded bit stream to support performance of a plurality of reception terminals and transmission network bands. For example, a hierarchically encoded bit stream of 120 progressive (P) and 60P in a time direction can be decoded as a 60P video in decoding in which only a 60P decoding sub-bit stream serving as a base layer is used, or as a 120P video if not only the base layer but also a 120P decoding subset serving as an enhancement layer is used.

On the other hand, Moving Picture Experts Group (MPEG)-2 Transport Stream (TS) is widely used as a technique for transmitting encoded bit streams on a transmission path having an error. A plurality of pieces of video and audio data can be multiplexed in MPEG-2 TS. When a hierarchically encoded bit stream is transmitted, each layer may be multiplexed with different PIDs (identifiers for identifying the payloads included in video, audio, or the like) to make processing of the stream by layer easier. MPEG-2 TS packets can also be transmitted using an Internet Protocol (IP). Patent Literature 1 discloses a transmission/reception device and a transmission/reception method that enable MPEG-2 TS packets to be stably transmitted even if there are fluctuating transmission delays. However, because a packet length of MPEG-2 TS is fixed to a small size (mainly 188 bytes), there is a problem that IP packetization entails increasing overhead.

For this reason, in MPEG Media Transport (MMT: ISO/IEC 23008-1) standardized as a successor for MPEG-2 TS, variable-length packets are employed, which enables efficient IP transmission. In addition, because IP data flows (transmission source IP address, transmission source port number, destination IP address, destination port number, and protocol type combination) can be allocated to each asset (video, audio, subtitles, and the like), a hierarchically encoded bit stream can be transmitted on different transmission paths by layers (hierarchical transmission).

In MMT, encoded bit streams are encapsulated and transmitted in a data unit called a media processing unit (MPU). FIG. 1 illustrates a relationship between an encoded bit stream and an MPU without taking hierarchical encoding into account, and FIG. 2 illustrates a relationship between an encoded bit stream and MPUs in hierarchical transmission. Each encoded bit stream includes one or more groups-of-pictures (GOPs), and each GOP includes one or more access units. An access unit is encoded video data corresponding to one frame in an encoded bit stream of H. 265.

Because it is fixed that an MPU encapsulates independently decodable data, an MPU of a video signal needs to be a unit of a GOP. In a case in which hierarchical coding is not considered, an encoded bit stream is divided at boundaries of GOPs, and all access units included in a GOP are encapsulated and transmitted in one MPU as illustrated in FIG. 1. FIG. 1 illustrates a case in which data is encapsulated in an MPU with packet_id (identifier of MMT) of 0x1000. In the case of hierarchical transmission, a hierarchically encoded bit stream is divided at boundaries of GOPs by layer and encapsulated and transmitted in MPUs having different packet_ids (0x2000 for a base layer and 0x2001 for an enhancement layer in FIG. 2). Unless the encoded bit stream is divided at the correct boundaries of the GOPs to construct an MPU, the encoded bit stream cannot be decoded correctly.

Furthermore, in order to receive an MPU transmitted hierarchically and decode a video using all of the base layer and the enhancement layer, it is desirable for an identifier that facilitates association of the layers to be imparted to the MPU. ARIB STD-B60 (a standard for media transport schemes using MMT in digital broadcasting) (see, e.g., Non Patent Literature 1) defines that, in transmission of a hierarchically encoded bit stream of 120P and 60P in a time direction, an identical MPU sequence number to that of the MPU including a base layer (60P sub-bit stream) belonging to an identical GOP is imparted to an MPU including an enhancement layer (120P subset).

However, two problems need to be solved to transmit, in MMT hierarchically, an MPEG-2 TS in which a hierarchically encoded bit stream is multiplexed by layer. A first problem is detection of a GOP boundary in each layer. In a 60P sub-bit stream that is hierarchically encoded at 120P and 60P in a time direction in accordance with ARIB STD-B32 (a standard for video encoding, audio encoding, and a multiplexing scheme in digital broadcasting) (see, e.g., Non Patent Literature 2), a GOP boundary can be detected using the types of network abstraction layer (NAL) units the types of network abstraction layer (NAL) units constituting an access unit. A type of an NAL unit can be readily identified from the nal_unit_type field of the header of the NAL unit. On the other hand, in a 120P subset, a GOP boundary cannot be detected using the types of NAL units constituting an access unit. A second problem is association of GOPs between layers. In general, if layers are multiplexed with different PIDs in MPEG-2 TS, a temporal relationship between the layers is not guaranteed. That is, an enhancement layer may delay the corresponding base layer and an enhancement layer may precede the corresponding base layer. The present disclosure has been made in view of this point.

CITATION LIST

Patent Literature

Patent Literature 1: JP 4092705 B

Non Patent Literature

Non Patent Literature 1: ARIB STD-B60 "MMT-Based Media Transport Scheme in Digital Broadcasting Systems," Association of Radio Industries and Businesses Non Patent Literature 2: ARIB STD-B32 "Video Coding, Audio Coding, and Multiplexing Specifications for Digital Broadcasting," Association of Radio Industries and Businesses

SUMMARY OF THE INVENTION

Technical Problem

The present disclosure aims to provide a method for detecting a GOP boundary of an encoded bit stream of each layer and associating GOPs of the layers with each other for hierarchical transmission in a video transmission device that transmits a hierarchically encoded bit stream.

Means for Solving the Problem

A video transmission device according to the present disclosure includes an input processing unit configured to extract access units from a group-of-pictures (GOP) constituting a hierarchically encoded bit stream and impart a decoding time stamp to each extracted access unit, a GOP number imparting unit configured to detect a GOP head access unit of a base layer from among the extracted access units, impart a GOP number to the GOP head access unit of the base layer, further detect a GOP head access unit of an enhancement layer using a decoding time stamp of the GOP head access unit of the base layer and individual decoding time stamps of access units of the enhancement layer, and impart a GOP number to the GOP head access unit of the enhancement layer in accordance with a decoding time stamp of the GOP head access unit of the enhancement layer, and a hierarchical transmission control unit configured to transmit hierarchically, access units of the base layer and access units of the enhancement layer using the GOP number imparted by the GOP number imparting unit.

A video transmission method according to the present disclosure includes an input processing procedure of a video transmission device extracting access units from a group-of-pictures (GOP) constituting a hierarchically encoded bit stream and imparting a decoding time stamp to each extracted access unit, a GOP number imparting procedure of the video transmission device detecting a GOP head access unit of a base layer from among the extracted access units, imparting a GOP number to the GOP head access unit of the base layer, further detecting a GOP head access unit of an enhancement layer using a decoding time stamp of the GOP head access unit of the base layer and individual decoding time stamps of access units of the enhancement layer, and imparting a GOP number to the GOP head access unit of the enhancement layer in accordance with a decoding time stamp of the GOP head access unit of the enhancement layer, and a hierarchical transmission control procedure of the video transmission device transmitting hierarchically, access units of the base layer and access units of the enhancement layer using the GOP number imparted in the GOP number imparting procedure.

Effects of the Invention

The present disclosure enables head positions of GOPs of a base layer and an enhancement layer to be detected in a video transmission device that transmits a hierarchically encoded bit stream so that the hierarchically encoded bit stream can be transmitted hierarchically in MMT.

BRIEF DESCRIPTION OF DRAWINGS

FIG. 4 illustrates an example of a data structure of a GOP head access unit.

FIG. 5 illustrates an example of a configuration of a video transmission device that hierarchically transmits, in MMT, a hierarchically encoded bit stream of 120P and 60P in a time direction that has been input in MPEG-2 TS.

FIG. 6 illustrates a relationship between an encoded bit stream and MPEG-2 TS.

DESCRIPTION OF EMBODIMENTS

An embodiment of the present disclosure will be described below in detail with reference to the drawings. Note that the present disclosure is not limited to the embodiment described below. The embodiment is merely an example, and the present disclosure can be implemented with various modifications and improvements made to the invention based on knowledge of a person skilled in the art. Note that constituent elements having identical reference signs in the present specification and the drawings are assumed to be the same.

Basic Configuration

Figure 3:
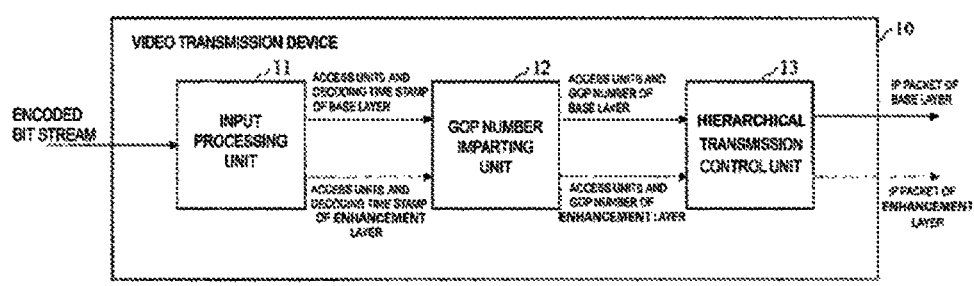
FIG. 3 illustrates an example of a basic configuration of a video transmission device.

A basic configuration of a video transmission device is illustrated in FIG. 3. The video transmission device 10 includes an input processing unit 11, a GOP number imparting unit 12, and a hierarchical transmission control unit 13.

The input processing unit 11 extracts access units in response to an input of a hierarchically encoded bit stream, applies a decoding time stamp to each of the access units, and passes the access units to the GOP number imparting unit 12 by layer. A "hierarchically encoded bit stream" of the present disclosure includes an encoded bit stream of a video signal with any hierarchical structure. The hierarchical structure includes a hierarchical structure of a time direction or a spatial direction.

The GOP number imparting unit 12 detects a GOP head access unit of a base layer by identifying the types of NAL units constituting each access unit of the base layer, and imparts a GOP number to the detected access unit. A GOP number is assumed to be imparted with an identical value until the next GOP head access unit is detected, and is incremented by one each time a GOP head access unit is detected. The GOP number may start from any value.

Next, the GOP number imparting unit 12 detects a head access unit of an enhancement layer of the same GOP from a decoding time stamp of the detected GOP head access unit of the base layer using the relationship between the decoding time stamp of the base layer and a decoding time stamp of the enhancement layer, and imparts the same GOP number as that of the base layer. With regard to the enhancement layer, the same GOP number is also imparted until the next GOP head access unit is detected. The access units with the GOP number imparted are passed to the hierarchical transmission control unit 13 by layer.

Figure 1:
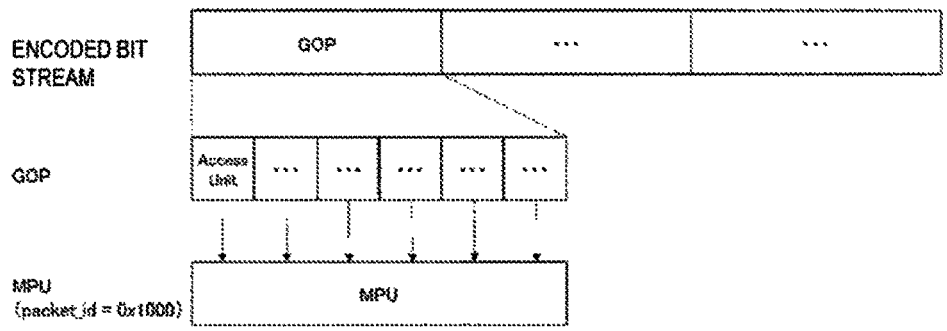
FIG. 1 illustrates an example of a relationship between an encoded bit stream and an MPU without taking hierarchical encoding into consideration.
Figure 2:
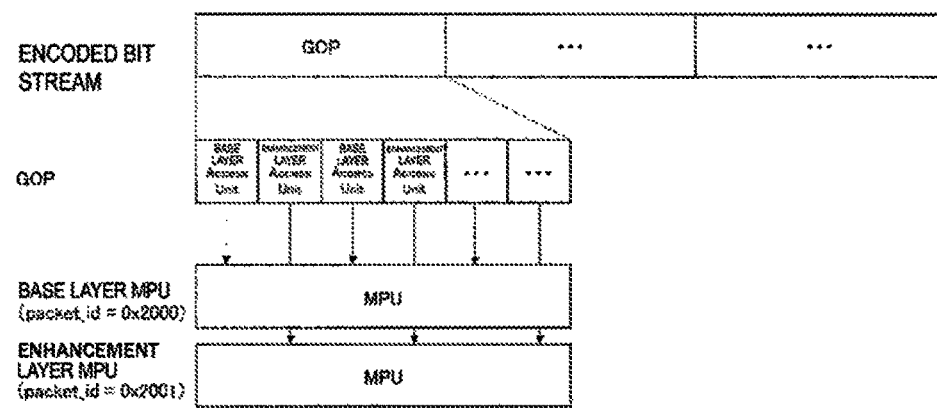
FIG. 2 illustrates a relationship between an encoded bit stream and MPUs in hierarchical transmission.

The hierarchical transmission control unit 13 constructs a data unit for hierarchical transmission with the access units having the same GOP number, and performs IP transmission. At this time, the hierarchical transmission control unit 13 encapsulates the access units of the base layer and the access units of the enhancement layer in MPUs having different packet_ids as illustrated in FIG. 2.

The temporal relationship between the decoding time stamps of the head access unit of the base layer and the head access unit of the enhancement layer belonging to the same GOP can be calculated in advance from a GOP structure and a frame rate. Then, the GOP number imparting unit 12 determines which layer precedes and how far ahead. Finally based on the relationship of the decoding time stamps, the head of the GOP of the enhancement layer that could not have been detected from the types of NAL units constituting each access unit is detected. In this way, data units (MPUs) for hierarchical transmission can be constructed.

FIG. 4 illustrates an example of a data structure of a GOP head access unit. The GOP structure for encoding may use, for example, a reference picture set of a sequence parameter set (SPS) encapsulated in a GOP head access unit. In addition, the GOP structure may set a fixed value.

For the decoding time stamp, for example, a decoding time stamp (DTS) encapsulated in the header of a packetized elementary stream (PES) may be used.

Specific Example of Hierarchical Transmission of Hierarchically Encoded Bit Stream in Time Direction in MMT FIG. 5 illustrates an example of a configuration of a video transmission device that hierarchically transmits, in MMT by layer, a hierarchically encoded bit stream with 120P and 60P in a time direction that has been input in MPEG-2 TS. The video transmission device 100 includes a TS processing unit 111, a GOP number imparting unit 112, and an MMT transmission control unit 113.

The time-direction hierarchically encoded bit stream is compliant with the time-direction hierarchical encoding provisions of ARIB STD-B32 (see, for example, Non Patent Literature 2). A relationship between an encoded bit stream and MPEG-2 TS is illustrated in FIG. 6. Here, a structure in which 60P, 120P, 60P, and 120P continue in an alternating manner is premised for an order of decoding each GOP. A 60P sub-bit stream corresponds to a base layer and a 120P subset corresponds to an enhancement layer. Because the 60P sub-bit stream and the 120P subset are multiplexed with different PIDs (0x0100 for the 60P sub-bit stream and 0x0101 for the 120P subset in FIG. 6), the temporal relationship between the layers are indefinite.

A DTS is encapsulated in the header of each of PESs and an access unit is encapsulated in a payload. The PESs are divided into TS packets and transmitted. The MPEG-2 TS also shares a value called program clock reference (PCR) which is counted by a 27-MHz clock of an encoder, and uses the PCR as time. For example, even if the PES with the DTS of 10000 is received, the PES is encapsulated in a buffer while the PCR is less than 10000. When the PCR reaches 10000, the PES begins to be decoded.

The TS processing unit 111 combines the payloads of the input TS packets to reconfigure the PESs and obtains the payloads of the PESs as access units. In addition, DTSs are acquired from the DTS fields of the headers of the PESs as decoding time stamps, imparted to the access units, and passed to the GOP number imparting unit 112. In this manner, the access units and the DTSs extracted from an identical PES are associated and sent to the GOP number imparting unit 12. At this time, a new data structure including the access units and the DTSs may be defined to associate the access units with the DTSs.

Figure 7:
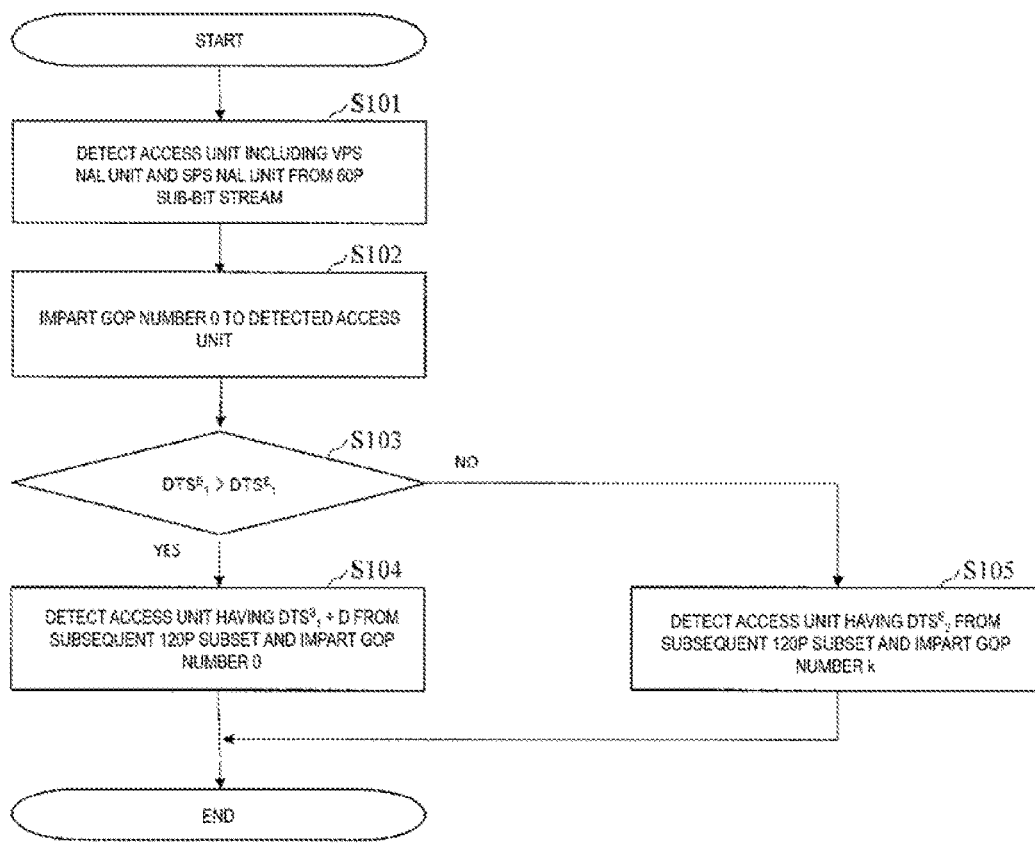
FIG. 7 illustrates an example of a processing flowchart in which a GOP number is imparted.

The GOP number imparting unit 112 detects the head of a GOP according to the processing flowchart illustrated in FIG. 7 and imparts a common GOP number to the access units belonging to the same GOP in the 60P sub-bit stream and the 120P subset.

According to the processing flowchart, a nal_unit_type field of the header of the NAL unit is read for each of the NAL units constituting the access units of the 60P sub-bit stream to detect an access unit including both a video parameter set (VPS) NAL unit and a sequence parameter set (SPS) NAL unit (S101). The "VPS NAL unit" and the "SPS NAL unit" are types of NAL units, and the "VPS NAL unit" and the "SPS NAL unit" encapsulate parameters for encoding, rather than encoding data themselves. Because the access unit including both the VPS NAL and the SPS NAL is only the GOP head, the detected access unit is considered to be the GOP head of the 60P sub-bit stream, and a GOP number "0" is imparted thereto (S102).

A DTS imparted to the access unit which is considered to be the GOP head of the base layer is assumed to be a $DTS^B_1$, a DTS imparted to the access unit of the 120P subset at that time is assumed to be $DTS^E_1$, and $DTS^B_1$ and $DTS^E_1$ are compared (S103). If $DTS^E_1 < DTS^B_1$, it is determined that the 60P sub-bit stream has preceded (Yes in S103). In this case, an access unit having a DTS satisfying $DTS^B_1 + D$ is detected from the subsequent 120p subset, and a GOP number "0" is imparted as the head of the 120P subset (S104).

Figure 8:
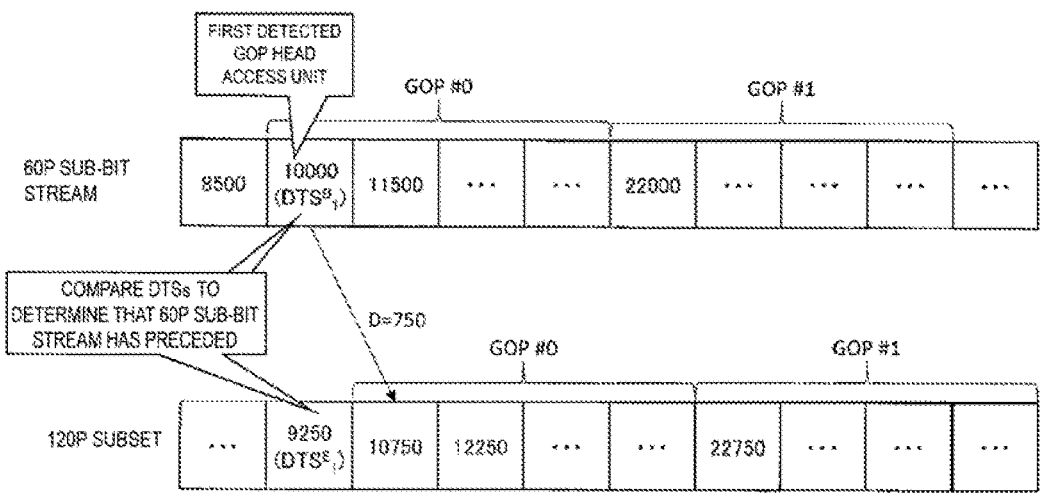
FIG. 8 illustrates a first example of a correspondence relationship between layers.

Here, "D" represents a DTS difference between the access units in which decoding is continuous. The DTS is a counter value of 90 kHz time resolution, and if a frame rate of an input video signal is F, it is determined according to D=90000/F. The equation becomes D=90000/120=750 in time-direction hierarchical encoding of 120P and 60P, and the equation becomes D=90000/60=1500 in time-direction hierarchical encoding of 60P and 30P. A value of "D" varies according to a frame rate of a video signal, and thus an appropriate value is used in accordance with conditions. A correspondence relationship between the layers at this time is illustrated in FIG. 8. The individual squares represent access units and the numbers represent DTSs. Although FIG. 8 illustrates a case in which the access unit one square later than the head is used, a detection technique of the present disclosure is not limited to such a case. Subsequent 120P subsets are sequentially monitored, appearance of an access unit having a DTS satisfying $DTS^B_1 + D$ is awaited, and thus the head of the GOP of the 120P subset can be detected.

In the case of $DTS^B_1 < DTS^E_1$ (No in S103), it is determined that the 120P subset has preceded, and an indication k representing how far ahead the $DTS^E_1$ precedes the $DTS^B_1$ in terms of the number of GOPs is calculated (S105).

[Formula 1]

$$K = \{(DTS^E_1 - DTS^B_1) \bmod T\} + 1 \qquad (1)$$

Figure 9:
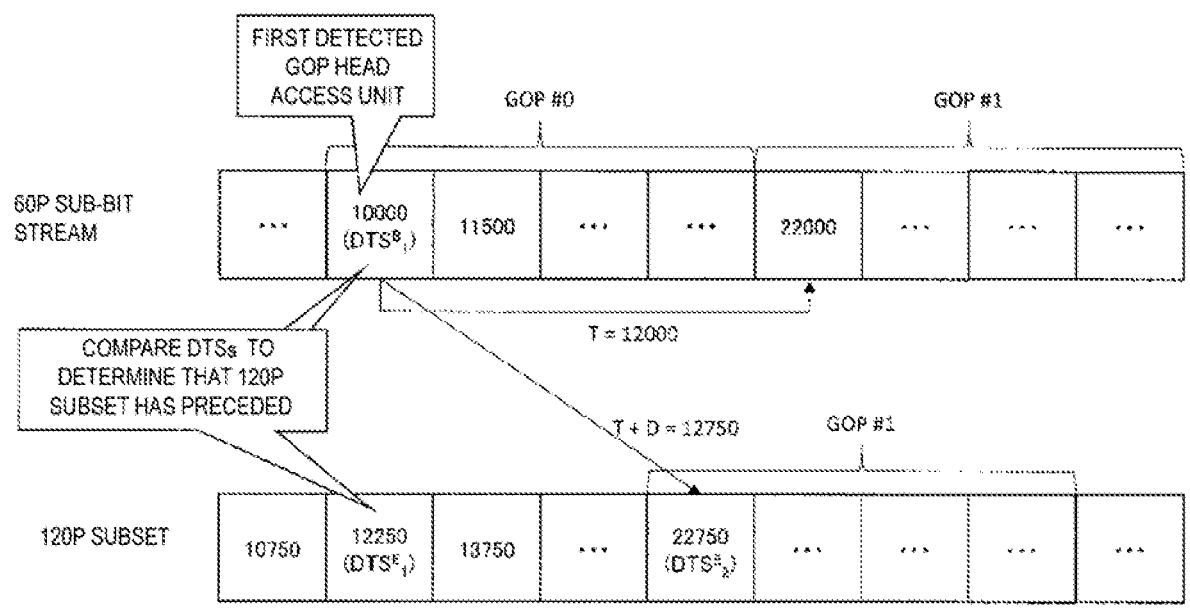
FIG. 9 illustrates a second example of a correspondence relationship between layers.

Here, T is the DTS difference corresponding to one GOP. The DTS at the head of the GOP that appears next in the 120P subset can be calculated using k in $DTS^E_2 = DTS^B_1 + k*T + D$. If the number of frames included in the GOP is set as L, T is expressed as T=D*L, and if D=750 and L=16 are set, T=12000 is satisfied. Here, L includes both the base layer and the enhancement layer. Because the frames of the base layer and the enhancement layer alternate at all times, for example, in the case of L=16, the base layer has L/2=8 frames and the enhancement layer has 8 frames. Subsequent 120P subsets are monitored to detect an access unit having $DTS^E_2$ to impart a GOP number"k". The correspondence relationship between the layers at this time is illustrated in FIG. 9. Although a case of k=1 is illustrated in FIG. 9, the detection technique of the present disclosure is not limited to such a case. By monitoring subsequent 120P subsets and waiting for appearance of the access unit having the DTS satisfying $DTS^B_1+k*T+D$, the head of the GOP of the 120P subset is detectable.

For example, as illustrated in FIG. 8, in a case in which the $DTS^B_1$ is "10000" and there is an access unit having $DTS^E_2=10750$ in the subsequent 120P subset, a GOP number "0" is imparted to the access unit having $DTS^E_2=10750$ as the head of the 120P subset. On the other hand, as illustrated in FIG. 9, the $DTS^B_1$ is "10000," $DTS^E_2=10750$ is not in the subsequent 120P subset, and there is an access unit having $DTS^E_2=22750$ corresponding to k=1. In this case, the GOP number "1" is imparted as the head of 120P subset.

The access units, each of which the GOP number is imparted to in the above-described method, are passed to the MMT transmission control unit 113. When the GOP structure is fixed, the number of access units in each of the layers is fixed, so once the head is found, the head of the GOP can be recognized by simply counting the number of access units. In a case in which the GOP structure is variable, the above-described method is repeated by incrementing the GOP number.

The MMT transmission control unit 113 receives the access units, constructs an MPU with the access units having the same GOP number, and performs IP transmission hierarchically according to the MMT protocol. The GOP number may be used as the MPU sequence number as is.

Effects

According to the present disclosure, in a case in which a hierarchical MPU is constructed by extracting access units from MPEG-2 TS in which a time-direction hierarchically encoded bit stream is multiplexed with different PIDs by layer, a GOP boundary of each layer can be correctly detected and an MPU can be constructed. Furthermore, using a GOP number, it is easy to impart an MPU sequence number common to an MPU including access units belonging to the same GOP.

Furthermore, a method for detecting a GOP head access unit using types of NAL units constituting each access unit described in the embodiment is easy to implement and is also suitable for hardware in that the position of the nal_unit_type field indicating a type of each NAL unit is fixed to the second to seventh bytes at the head of the NAL unit.

Furthermore, because it is possible to sequentially analyze the access units and detect the head, there is no need to provide a buffer for accumulating the access units. Therefore, even if a time difference between the base layer and the enhancement layer is large, buffer overflow does not occur. In addition, as no buffer is provided, the mounting costs can be reduced accordingly. Furthermore, it is advantageous that there is no increase in time delay that is caused by accumulation in the buffer.

INDUSTRIAL APPLICABILITY

The present disclosure can be applied in the information communication industry.

REFERENCE SIGNS LIST 10, 100 Video transmission device
11 Input processing unit
12, 112 GOP number imparting unit
13 Hierarchical transmission control unit
111 TS processing unit
113 MMT transmission control unit

The invention claimed is:

1. A video transmission device for transmitting a hierarchically encoded bit stream to which layers are multiplexed with different identifiers comprising:
   an input processing unit configured to extract access units from a group-of-pictures (GOP) constituting a hierarchically encoded bit stream and impart a decoding time stamp to each extracted access unit;
   a GOP number imparting unit configured to detect a GOP head access unit of a base layer from among the extracted access units, impart a GOP number to the GOP head access unit of the base layer, further detect a GOP head access unit of an enhancement layer using a decoding time stamp of the GOP head access unit of the base layer and individual decoding time stamps of access units of the enhancement layer, and impart a GOP number to the GOP head access unit of the enhancement layer in accordance with a decoding time stamp of the GOP head access unit of the enhancement layer; and
   a hierarchical transmission control unit configured to transmit, hierarchically, access units of the base layer and access units of the enhancement layer using the GOP number imparted by the GOP number imparting unit,
   wherein the GOP number imparting unit is configured to determine whether the decoding time stamp of the GOP head access unit of the base layer is greater or smaller than a decoding time stamp of the access unit of the enhancement layer which is simultaneously input with the GOP head access unit of the base layer, and
   when the decoding time stamp of the access unit of the enhancement layer is greater than the decoding time stamp of the GOP head access unit of the base layer, to determine that the enhancement layer precedes the base layer and to impart, as a GOP number for the GOP head access unit of the enhancement layer, a GOP number that is different from the GOP number imparted to the GOP head access unit of the base layer.

2. The video transmission device according to claim 1, wherein the GOP number imparting unit identifies types of network abstraction layer (NAL) units included in each access unit of the base layer to detect the GOP head access unit of the base layer.

3. The video transmission device according to claim 2, wherein the GOP number imparting unit detects an access unit including both a video parameter set (VPS) NAL unit and a sequence parameter set (SPS) NAL unit as the GOP head access unit of the base layer.

4. The video transmission device according to claim 1, wherein the hierarchically encoded bit stream is transmitted using MPEG-2 TS, and
   the input processing unit is a TS processing unit that reconfigures a packetized elementary stream (PES) from MPEG-2 TS and imparts a decoding time stamp (DTS) included in a header of the PES as the decoding time stamp to an access unit obtained from a payload of the PES.

5. The video transmission device according to claim 4, wherein the GOP number imparting unit is configured
to determine whether the decoding time stamp $DTS^B_1$ of the GOP head access unit of the base layer is greater or smaller than a decoding time stamp $DTS^E_1$ of the access unit of the enhancement layer which is simultaneously input with the GOP head access unit of the base layer, and
to detect, when the $DTS^E_1$ is smaller than the $DTS^B_1$ as the GOP head access unit of the enhancement layer, an access unit of the enhancement layer whose DTS has a value equal to the sum of a value of the $DTS^B_1$ and a DTS difference value between two consecutive access units, and imparts, to the detected GOP head access unit of the enhancement layer, a GOP number identical to the GOP number imparted to the GOP head access unit of the base layer and
to calculate, when the $DTS^E_1$ is greater than the $DTS^B_1$, an indication k representing how far ahead the $DTS^E_1$ precedes the $DTS^B_1$ in terms of the number of GOPs, and to impart a GOP number corresponding to the calculated indication k.

6. The video transmission device according to claim 5, wherein
when T is the DTS difference corresponding to one GOP, and D is a DTS difference value between two consecutive access units,
the GOP number imparting unit
calculates the indication k by using $k=\{(DTS^E_1-DTS^B_1) \mod T\}+1$, and
detects the GOP head access unit of the enhancement layer by awaiting appearance of an access unit having a DTS satisfying $DTS^B_1+k*T+D$ of the enhancement layer by sequentially monitoring the decoding time stamps of the access units of subsequent enhancement layers.

7. The video transmission device according to claim 1, wherein the hierarchical transmission control unit is an MMT transmission control unit that encapsulates the access units of the base layer and the access units of the enhancement layer in each of media processing units (MPUs) having different packet_ids and transmits the MPUs according to an MPEG Media Transport (MMT) protocol.

8. A video transmission method comprising:
an input processing procedure of a video transmission device extracting access units from a group-of-pictures (GOP) constituting a hierarchically encoded bit stream and imparting a decoding time stamp to each extracted access unit;
a GOP number imparting procedure of the video transmission device detecting a GOP head access unit of a base layer from among the extracted access units, imparting a GOP number to the GOP head access unit of the base layer, further detecting a GOP head access unit of an enhancement layer using a decoding time stamp of the GOP head access unit of the base layer and individual decoding time stamps of access units of the enhancement layer, and imparting a GOP number to the GOP head access unit of the enhancement layer in accordance with a decoding time stamp of the GOP head access unit of the enhancement layer; and
a hierarchical transmission control procedure of the video transmission device transmitting, hierarchically, access units of the base layer and access units of the enhancement layer using the GOP number imparted in the GOP number imparting procedure
wherein the GOP number imparting procedure determine whether the decoding time stamp of the GOP head access unit of the base layer is greater or smaller than a decoding time stamp of the access unit of the enhancement layer which is simultaneously input with the GOP head access unit of the base layer, and
when the decoding time stamp of the access unit of the enhancement layer is greater than the decoding time stamp of the GOP head access unit of the base layer, determines that the enhancement layer precedes the base layer and imparts, as a GOP number for the GOP head access unit of the enhancement layer, a GOP number that is different from the GOP number Imparted to the GOP head access unit of the base layer.

9. The video transmission method according to claim 8, wherein
the hierarchically encoded bit stream is transmitted using MPEG-2 TS,
the input processing procedure is a TS processing procedure to reconfigure a packetized elementary stream (PES) from MPEG-2 TS and impart a decoding time stamp (DTS) included in a header of the PES as the decoding time stamp to an access unit obtained from a payload of the PES, and
in the GOP number imparting procedure,
whether the decoding time stamp $DTS^B_1$ of the GOP head access unit of the base layer is greater or smaller than a decoding time stamp $DTS^E_1$ of the access unit of the enhancement layer which is simultaneously input with the GOP head access unit of the base layer, is determined, and
when the $DTS^E_1$ is smaller than the $DTS^B_1$, as the GOP head access unit of the enhancement layer, an access unit of the enhancement layer whose DTS has a value equal to the sum of a value of the $DTS^B_1$ and a DTS difference value between two consecutive access units is detected, and a GOP number identical to the GOP number imparted to the GOP head access unit of the base layer is imparted to the detected GOP head access unit of the enhancement layer, and
when the $DTS^E_1$ is greater than the $DTS^B_1$, an indication k representing how far ahead the $DTS^E_1$ precedes the $DTS^B_1$ in terms of the number of GOPs is calculated, and a GOP number corresponding to the calculated indication k is imparted.

10. The video transmission method according to claim 9 wherein
when T is the DTS difference corresponding to one GOP, and D is a DTS difference value between two consecutive access units,
the GOP number imparting procedure
calculates the indication k by using $k=\{(DTS^E_1-DTS^B_1) \mod T\}+1$, and
detects the GOP head access unit of the enhancement layer by awaiting appearance of an access unit having a DTS satisfying $DTS^B_1+k*T+D$ of the enhancement layer by sequentially monitoring the decoding time stamps of the access units of subsequent enhancement layers.

* * * * *